United States Patent
Kim

(10) Patent No.: US 11,621,595 B2
(45) Date of Patent: Apr. 4, 2023

(54) ROTOR PLATE, ROTOR, MOTOR AND VEHICLE INCLUDING SAME

(71) Applicant: LG INNOTEK CO., LTD., Seoul (KR)

(72) Inventor: Jung Keun Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 17/510,034

(22) Filed: Oct. 25, 2021

(65) Prior Publication Data

US 2022/0045565 A1 Feb. 10, 2022

Related U.S. Application Data

(63) Continuation of application No. 16/070,214, filed as application No. PCT/KR2016/014259 on Dec. 7, 2016, now Pat. No. 11,183,894.

(30) Foreign Application Priority Data

Jan. 14, 2016 (KR) ........................ 10-2016-0004770

(51) Int. Cl.
*H02K 1/27* (2022.01)
*H02K 1/278* (2022.01)
*B62D 5/04* (2006.01)

(52) U.S. Cl.
CPC ........... *H02K 1/278* (2013.01); *B62D 5/0403* (2013.01); *H02K 2201/06* (2013.01)

(58) Field of Classification Search
CPC ...... H02K 1/278; H02K 2201/06; H02K 1/22; B62D 5/0403
See application file for complete search history.

(56) References Cited

U.S. PATENT DOCUMENTS

2006/0131980 A1* 6/2006 Weihrauch ............ H02K 1/276
310/216.116
2007/0152521 A1 7/2007 Park
2015/0084469 A1 3/2015 Yazaki
2015/0108867 A1 4/2015 Nakagawa et al.

FOREIGN PATENT DOCUMENTS

| CN | 203039449 U | 7/2013 |
| CN | 103779993 A | 5/2014 |
| JP | 3-60855 U | 6/1991 |
| JP | 9-182387 A | 7/1997 |
| JP | 2000-4550 A | 1/2000 |

(Continued)

*Primary Examiner* — Thomas Truong

(74) *Attorney, Agent, or Firm* — Birch, Stewart, Kolasch & Birch, LLP

(57) ABSTRACT

The present invention provides a motor comprising, a shaft, a rotor including a shaft hole in which the shaft is disposed, the rotor including a plurality of rotor plates stacked to each other and a stator disposed outside the rotor, wherein each rotor plate includes a plurality of guide pin holes disposed around the shaft hole in a circumferential direction and a skew check hole including a skew reference surface, wherein an outer circumferential surface of each rotor plate is attached with magnets, and an angle between lines connecting centers of the adjacent guide pin holes with a center of the shaft hole is greater than a skew angle of each rotor plate.

7 Claims, 8 Drawing Sheets

(56) References Cited

FOREIGN PATENT DOCUMENTS

| | | |
|---|---|---|
| JP | 2005-218194 A | 8/2005 |
| JP | 2013-110930 A | 6/2013 |
| JP | 2014-110646 A | 6/2014 |
| JP | 2015-61466 A | 3/2015 |
| KR | 10-2005-0122557 A | 12/2005 |

* cited by examiner

[FIG. 1]
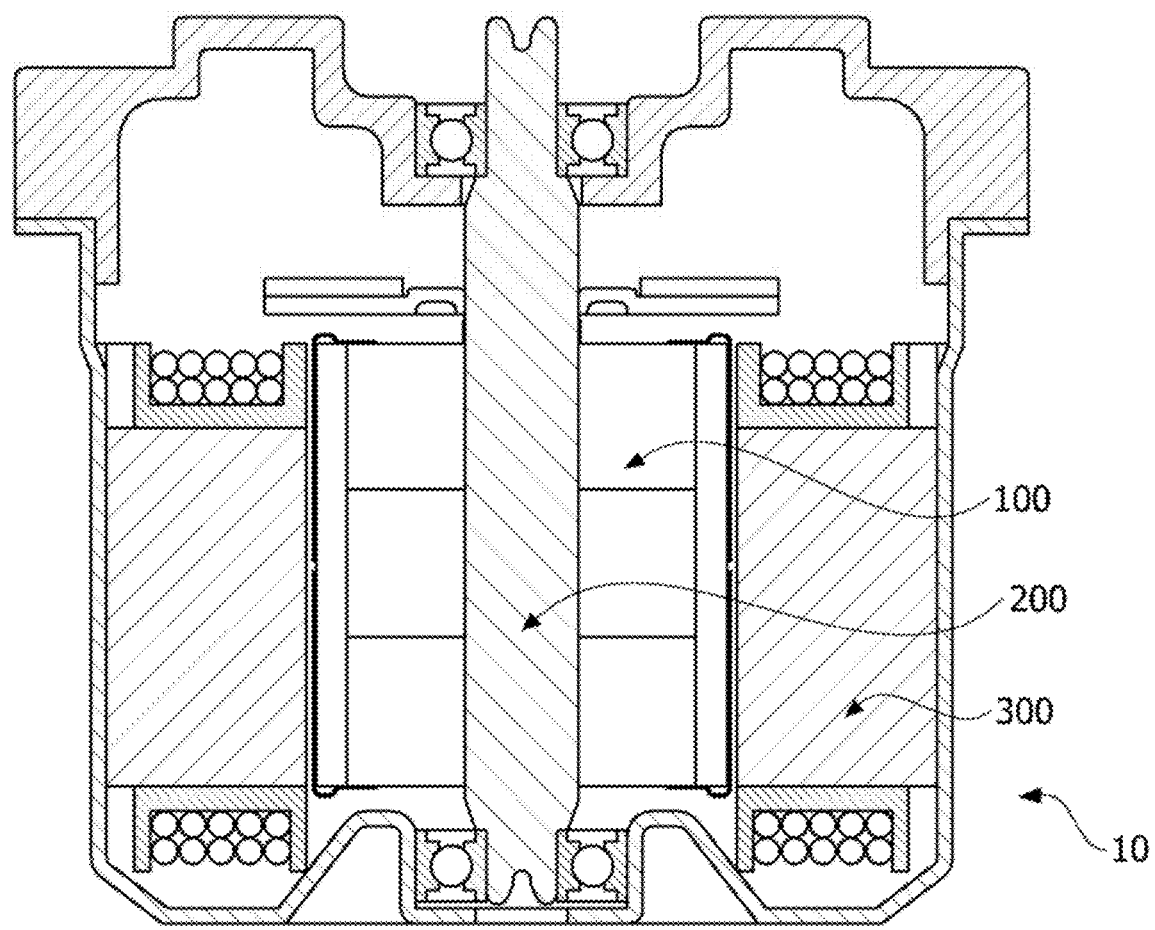

[FIG. 2]
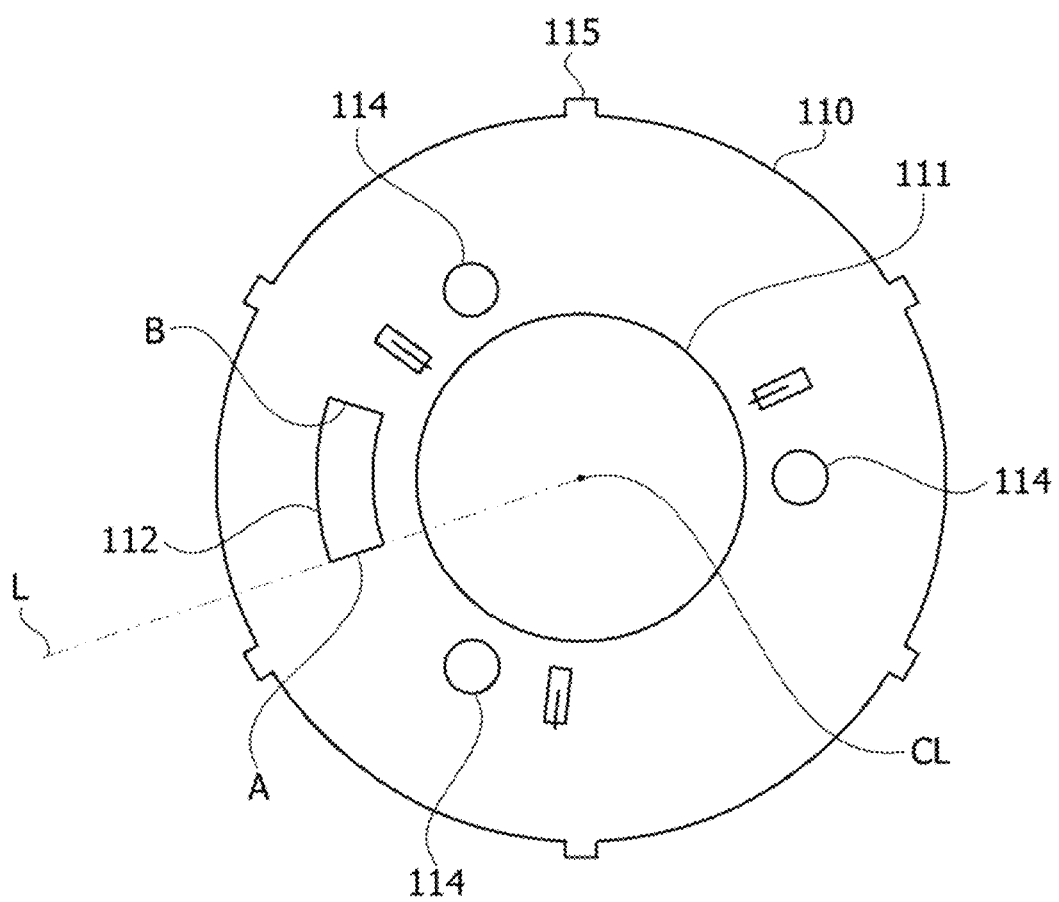

[FIG. 3]
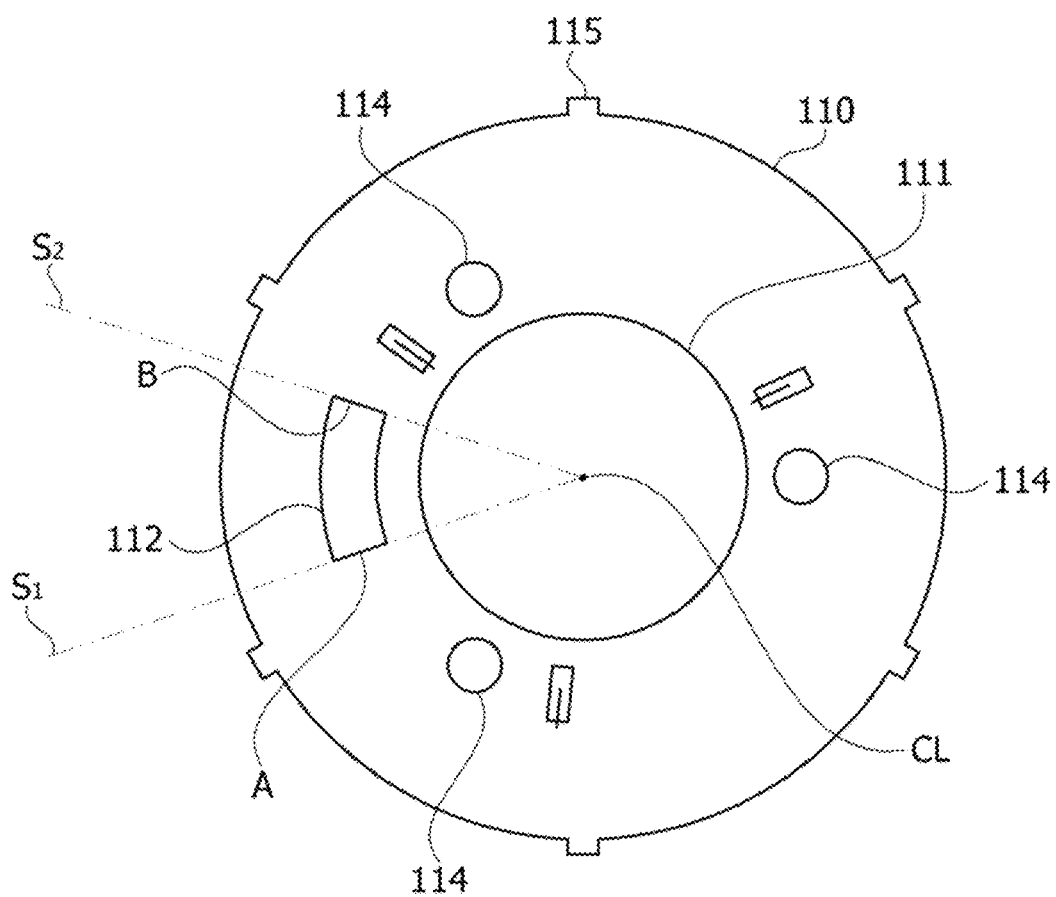

[FIG. 4]
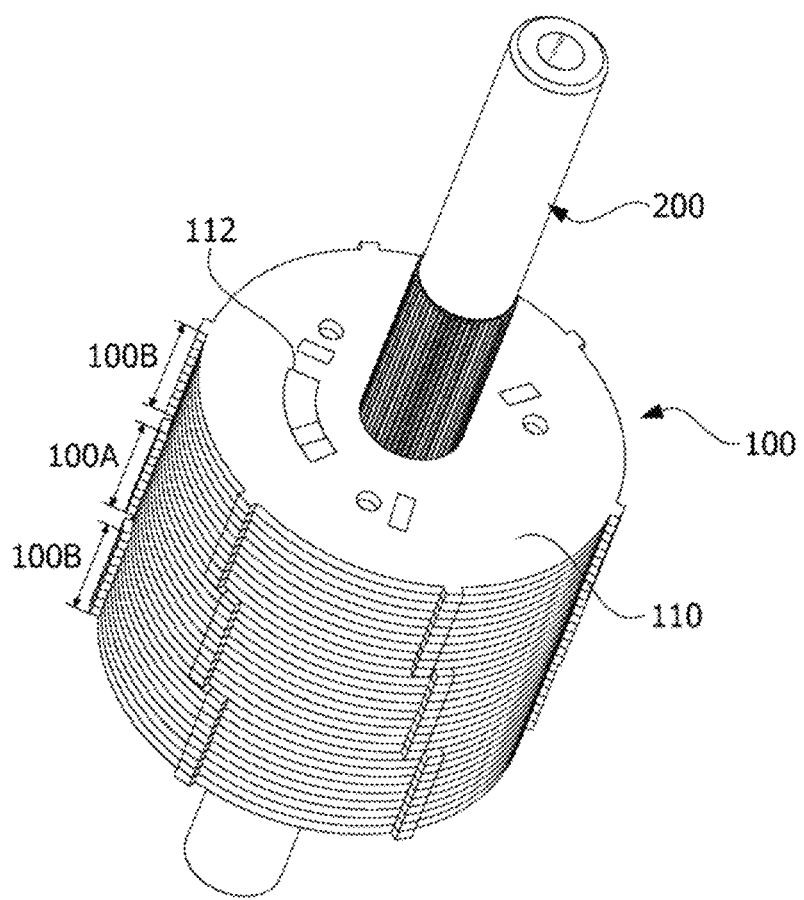

[FIG. 5]
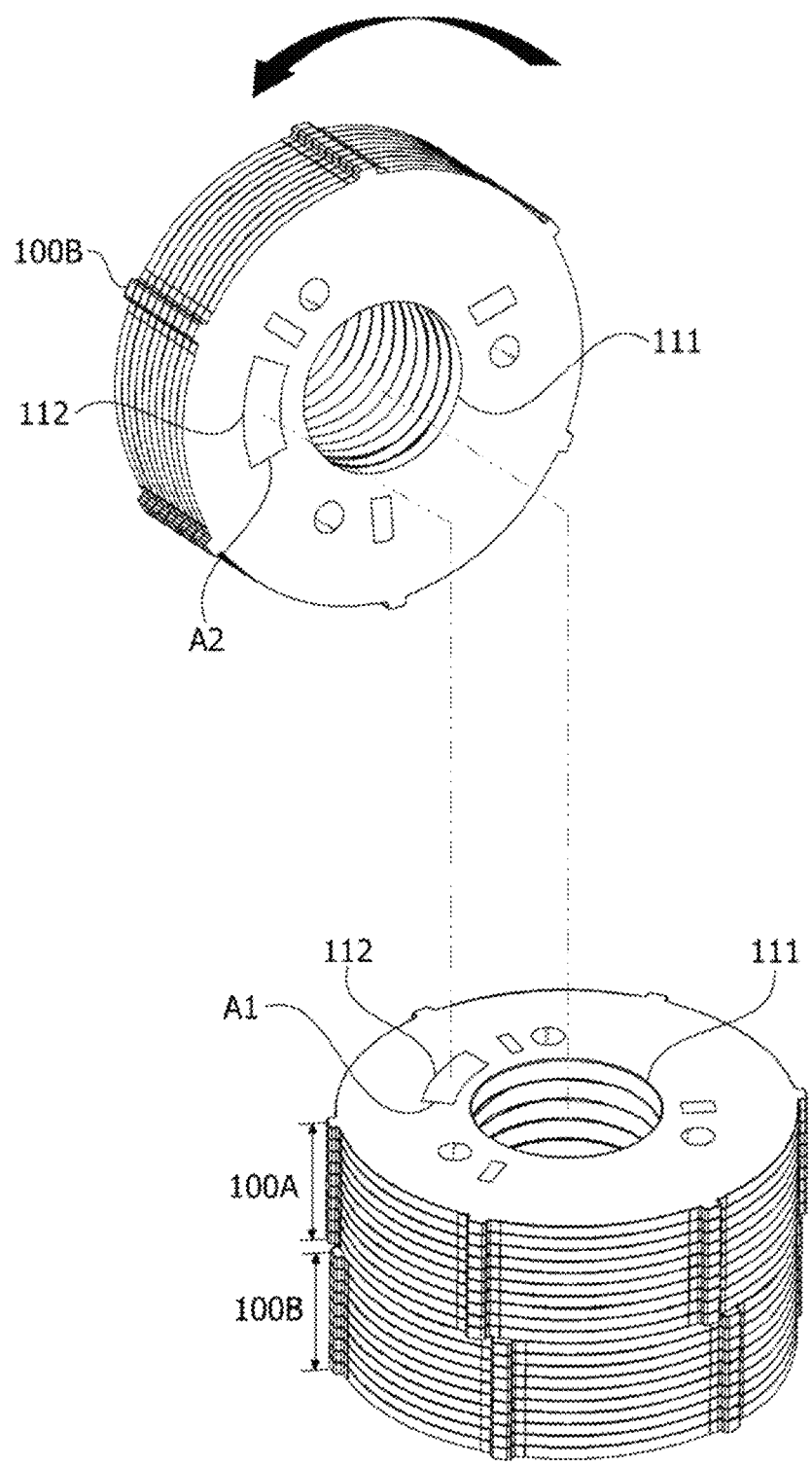

[FIG. 6]
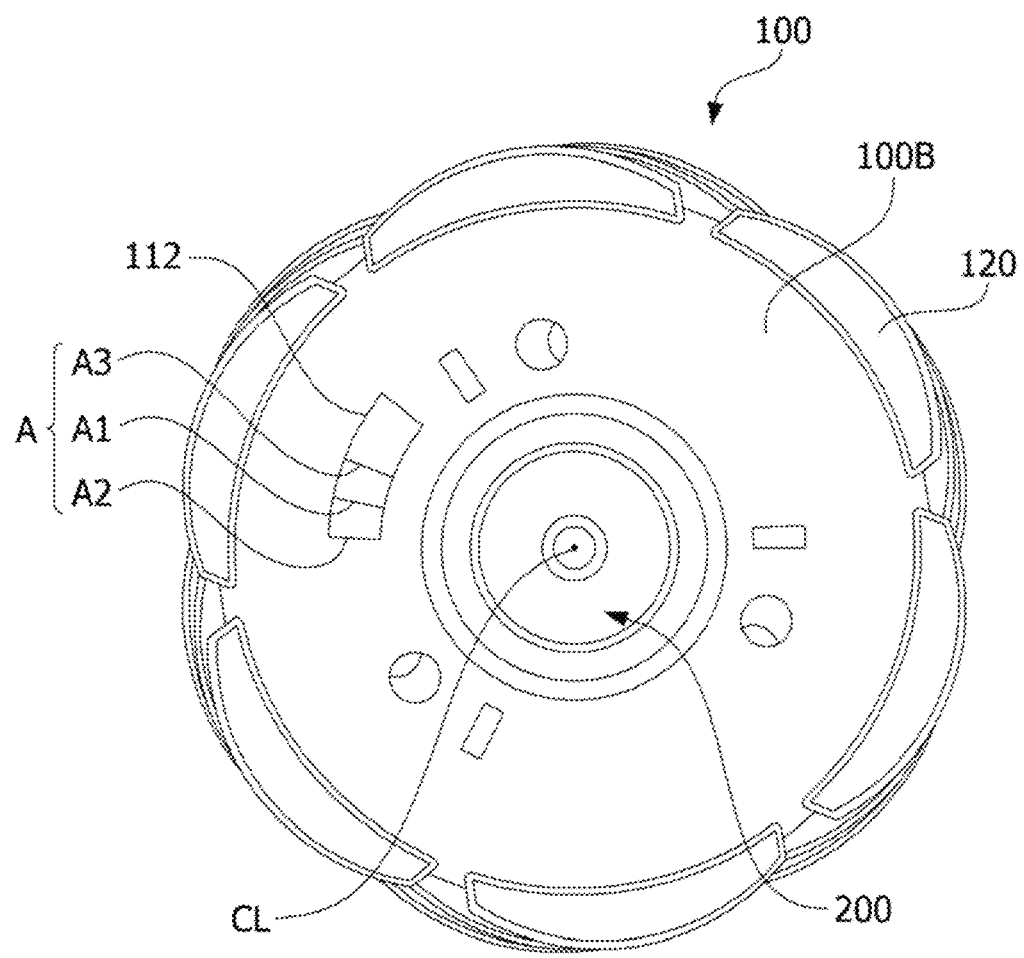

[FIG. 7]
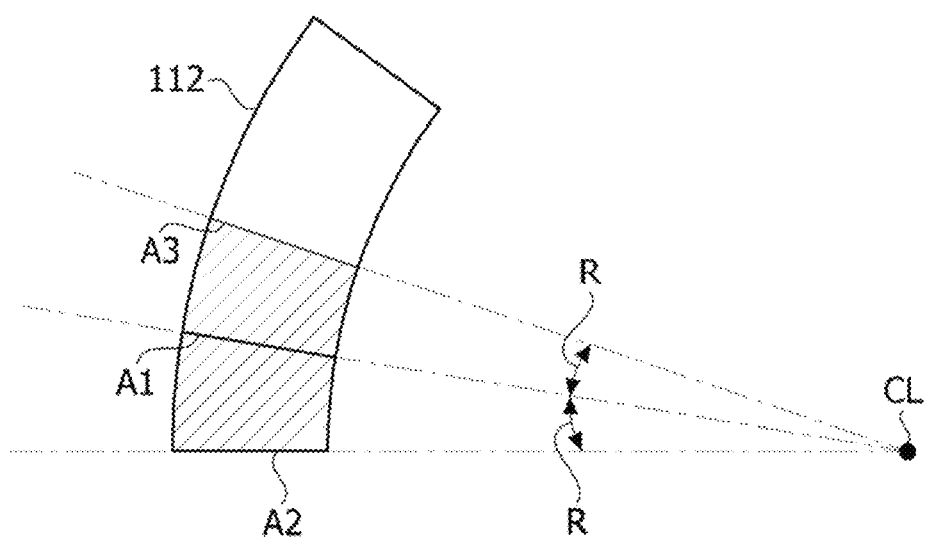

[FIG. 8]
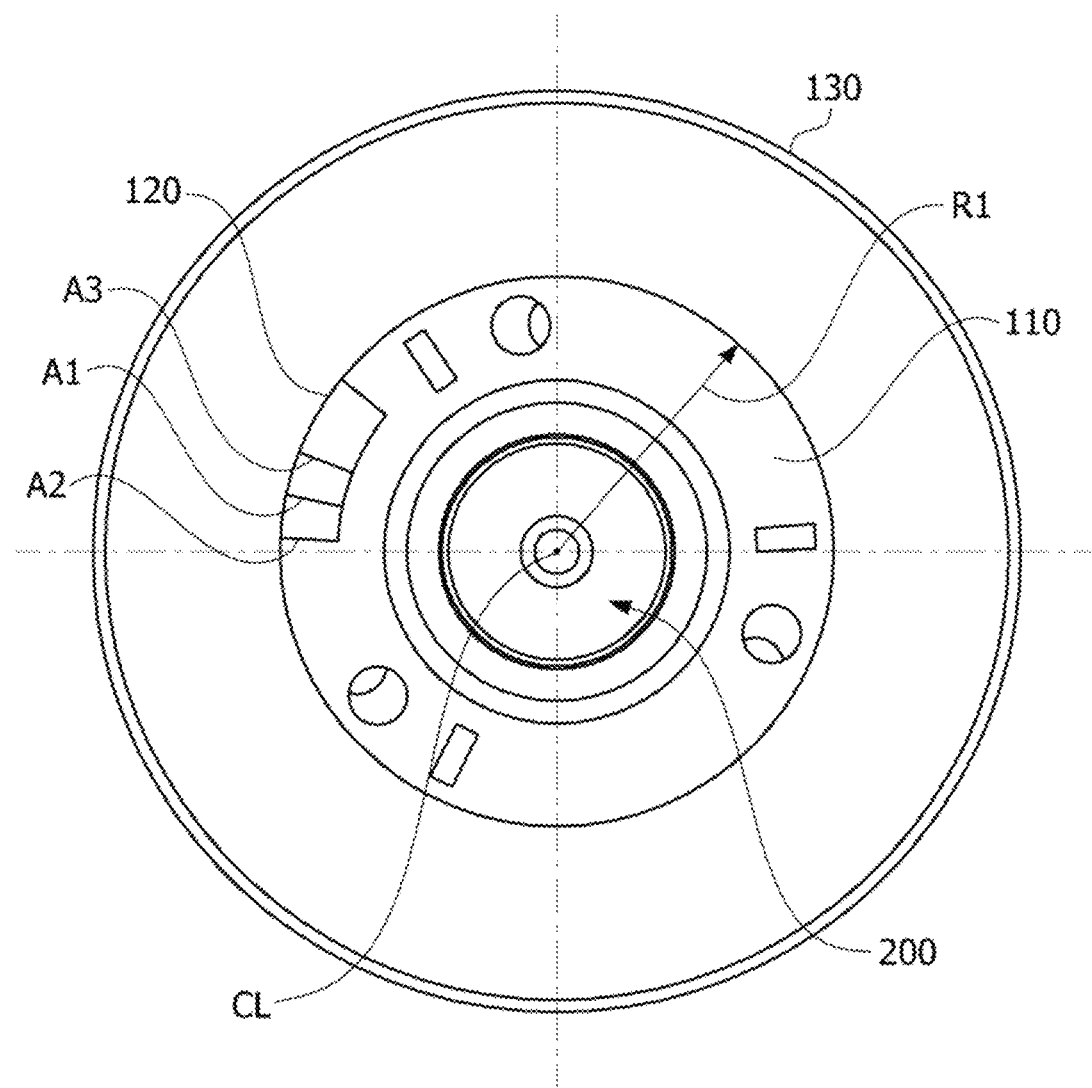

ROTOR PLATE, ROTOR, MOTOR AND VEHICLE INCLUDING SAME

CROSS REFERENCE TO RELATED APPLICATIONS

This application is a Continuation of copending application Ser. No. 16/070,214, filed on Jul. 13, 2018, which is the National Phase of PCT/KR2016/014259 filed on Dec. 7, 2016, which claims priority under 35 U.S.C. § 119(a) to Patent Application No. 10-2016-0004770 filed in the Republic of Korea on Jan. 14, 2016, all of which are hereby expressly incorporated by reference into the present application.

FIELD OF THE INVENTION

The present invention relates to a rotor plate, a rotor, a motor, and a vehicle including the same.

BACKGROUND OF THE INVENTION

A motor includes a rotating shaft which is rotatably formed, a rotor coupled to the rotating shaft, and a stator fixed inside a housing, and the stator is installed to be spaced apart from the rotor along a circumference of the rotor. In addition, coils for generating a rotating magnetic field are wound around the stator, and the stator and the rotor may induce an electromagnetic interaction to induce rotation of the rotor.

Generally, a rotor is manufactured by stacking rotor plates having a thin plate shape to form a plurality of rotors (pucks), and press-fitting the rotors (pucks) to a rotating shaft.

Here, the rotor may be manufactured as a skew type rotor in which the plurality of rotors (pucks) may be disposed askew to reduce a cogging torque. In addition, the rotor may be manufactured by being coupled to a can or a molding member to cover an outer portion of the rotors (pucks) disposed askew at skew angles.

Accordingly, there is a problem in that the completed rotor has difficulty in visually identifying skew angles of the rotors (pucks). This is because outer circumferential surfaces of the rotors (pucks), through which the skew angles may be identified, are hidden by the can or the molding member.

SUMMARY OF THE INVENTION

The present invention is directed to providing a rotor plate, a rotor assembly, a motor in which a skew angle of the rotor may be visually identified in a state in which an outer circumferential surface of the rotor is hidden by a can or a molding member, and a vehicle including the same.

Objectives to be achieved by embodiments of the present invention are not limited to the above-described objectives, and other objectives, which are not described above, may be clearly understood by those skilled in the art through the following specification.

One aspect of the present invention provides a rotor plate including a rotating shaft hole, and a skew check hole including a skew reference surface which is parallel to a reference line drawn from a center of the rotating shaft hole in a radius direction.

The skew reference surface may include a first skew reference surface and a second skew reference surface which face each other.

An angle between the first skew reference surface and the second skew reference surface may be greater than a skew angle.

The rotor plate may further include a plurality of guide pin holes, wherein the skew check hole may be disposed between the guide pin holes in a circumferential direction.

An extended plane of the skew reference surface of the skew check hole may pass through the center of the rotating shaft hole.

Another aspect of the present invention provides a rotor including a plurality of rotor plates which are stacked and include rotating shaft holes and skew check holes having skew reference surfaces which are parallel to reference lines drawn from centers of the rotating shaft holes in a radius direction.

The rotor may further include a first rotor core, and a second rotor core, wherein the first rotor core and the second rotor core may include the plurality of the rotor plates which are stacked such that the skew reference surfaces are arranged in a circumferential direction based on the centers of the rotating shaft holes, and may be stacked askew in the circumferential direction based on the centers of the rotating shaft holes such that the skew reference surfaces of the first rotor core are positioned within the skew check holes of the second rotor core.

The rotor may further include magnets attached to an outer circumferential surface of the first rotor core and an outer circumferential surface of the second rotor core.

The rotor may further include a cover member configured to cover the first rotor core and the second rotor core such that the skew check holes are exposed.

In the rotor, the skew reference surface may include a first skew reference surface and a second skew reference surface which face each other.

In the rotor, an angle between the first skew reference surface and the second skew reference surface may be greater than a skew angle.

In the rotor, the rotor plate may include a plurality of guide pin holes, and the skew check hole may be disposed between the guide pin holes in a circumferential direction.

An extended plane of the skew reference surface of the skew check hole may pass through the center of the rotating shaft hole.

Still another aspect of the present invention provides a motor including a rotating shaft, a rotor including a rotating shaft hole in which the rotating shaft is disposed, and a stator disposed outside the rotor, wherein the rotor includes a plurality of rotor plates which are stacked and have skew check holes including skew reference surfaces which are parallel to reference lines drawn from centers of the rotating shaft holes in a radius direction.

Yet another aspect of the present invention provides a vehicle including a motor including a rotating shaft, a rotor having a rotating shaft hole in which the rotating shaft is disposed, and a stator disposed outside the rotor, wherein the rotor includes a plurality of rotor plates which are stacked and have skew check holes having skew reference surfaces which are parallel to reference lines drawn from centers of the rotating shaft holes in a radius direction.

According to one embodiment of the present invention, an advantageous effect can be provided such that a skew angle can be identified through a skew check hole even in a state in which an outer circumferential surface of a rotor is covered by a cover member such as a can or a molding member.

BRIEF DESCRIPTION OF THE DRAWINGS

FIG. 1 is a view illustrating a motor according to an embodiment.

FIG. 2 is a view illustrating a rotor plate according to the embodiment.

FIG. 3 is a view illustrating an extended plane of a skew reference surface.

FIG. 4 is a view illustrating a rotor formed of rotor plates illustrated in FIG. 2.

FIG. 5 is a view illustrating rotor cores disposed askew at a skew angle.

FIG. 6 is a plan view illustrating the rotor of which skew angles may be visually identified.

FIG. 7 is a view illustrating the skew angles visually identified through a skew check hole.

FIG. 8 is a view illustrating a cover member and a skew check hole.

MODES OF THE INVENTION

Hereinafter, exemplary embodiments of the present invention will be described with reference to the accompanying drawings in detail. Purposes, specific advantages, and novel features of the invention will be made clear from the exemplary embodiments and the following detailed description in connection with the accompanying drawings. Terms and words used in this specification and claims are not to be interpreted as limited to commonly used meanings or meanings in dictionaries and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

FIG. 1 is a view illustrating a motor according to an embodiment.

Referring to FIG. 1, a motor 10 according to the embodiment may include a rotor 100, a rotating shaft 200, and a stator 300.

The rotor 100 is disposed inside the stator 300. The rotor 100 may be formed by coupling a rotor core and a magnet, and in some cases, the rotor core and the magnet may also be formed integrally. In addition, the rotor 100 may be formed in a manner in which the magnet is coupled to an outer circumferential surface of the rotor core or the magnet is inserted into a pocket of the rotor core. A sensing magnet for obtaining position information of the rotor 100 is coupled to a plate and installed above the rotor 100, or a similar rotor position detecting unit may be installed thereabove.

The rotating shaft 200 may be coupled to the rotor 100.

The stator 300 may be formed by stacking a plurality of steel plates including ring-shaped yoke portions and tooth portions disposed in a circumferential direction, protruding inward from the yoke portions in a diameter direction, and spaced an equiangular interval from each other. Coils for generating a rotating electromagnetic field may be wound around the tooth portions.

When a current is supplied to the coils wound around the stator 300, a mutual interaction is induced between the stator 200 and the rotor 100 to induce rotation of the rotor 100. When the rotor 100 rotates, a rotating shaft 200 rotates to provide power.

The motor may be a motor applied to a steering system of a vehicle to supplement a steering force (for example, an electronic power steering (EPS)).

FIG. 2 is a view illustrating a rotor plate according to the embodiment, FIG. 3 is a view illustrating extended planes of a skew reference surface, and FIG. 4 is a view illustrating a rotor formed of rotor plates illustrated in FIG. 2.

Referring to FIGS. 2 to 4, the rotor 100 (see FIG. 1) may be formed by stacking a plurality of rotor plates 110.

The rotor plate 110 may include a rotating shaft hole 111 and a skew check hole 112. The rotating shaft hole 111 is a hole which is formed at a central portion of the rotor plate 110 and into which the rotating shaft 200 is press-fitted. The skew check hole 112 is a hole through which a skew angle is visually identified even in a state in which the outer circumferential surface of the rotor 100 is hidden by a can or a molding member.

The skew check hole 112 includes skew reference surfaces A and B. The skew reference surfaces A and B are reference surfaces for measuring a skew angle and are formed in parallel to a reference line L. Here, the reference line L means a virtual line drawn from a center CL of the rotating shaft hole 111 in a radius direction.

The skew reference surfaces A and B may be disposed such that extended planes S1 and S2 of the skew reference surfaces A and B pass through the center CL of the rotating shaft hole 111.

A part of the rotor plate 110 may be cut to form the skew reference surfaces A and B of the skew check hole 112. Meanwhile, the skew reference surfaces A and B may include a first skew reference surface A and a second skew reference surface B. The first skew reference surface A and the second skew reference surface B may be side surfaces of the skew check hole 112 which face each other.

Meanwhile, the skew check hole 112 may be designed such that an angle between the first skew reference surface A and the second skew reference surface B is greater than a skew angle. This is to identify the skew reference surfaces A and B of another rotor plate 110 through the upper most skew check hole 112.

The skew check hole 112 may be disposed between guide pin holes 114 in a circumferential direction of the rotor plate 110. The guide pin holes 114 are holes for arranging and stacking the rotor plates 110. The rotor 100 may be formed of a plurality of rotors (pucks) in which the rotor plates 110 having a thin plate shape are stacked, and here, guides are inserted into the guide pin holes 114 to induce arrangement of the rotor plates 110.

Referring to FIG. 4, the rotor 100 may be formed of a plurality of rotor cores. For example, the rotor 100 may include a first rotor core 100A and second rotor cores 100B. The first rotor core 100A and the second rotor cores 100B may be formed as puck type first and second rotor cores 100A and 100B in which the rotor plates 110 are stacked and the skew check holes 112 are arranged.

As illustrated in FIG. 4, the rotor 100 may be formed of a total of three rotor cores in which the second rotor cores 100B are stacked on and below the first rotor core 100A which is centered therebetween.

FIG. 5 is a view illustrating rotor cores disposed askew at a skew angle, and FIG. 6 is a plan view illustrating the rotor of which skew angles may be visually identified.

Referring to FIGS. 5 and 6, the first rotor core 100A and the second rotor cores 100B may be stacked askew at a skew angle. Here, the first rotor core 100A and the second rotor cores 100B may be stacked such that a skew reference surface (hereinafter, referred to as A1) of the first rotor core 100A is identified through the skew check hole 112 of the stacked uppermost second rotor core 100B. In addition, the first rotor core 100A and the second rotor cores 100B may be stacked such that the skew reference surface (hereinafter, referred to as A3) of the second rotor core 100B stacked under the first rotor core 100A is identified through the skew check hole 112 of the stacked uppermost second rotor core 100B.

A magnet 120 may be attached to an outer circumferential surface of the rotor plate 110.

FIG. 7 is a view illustrating the skew angles visually identified through a skew check hole.

Referring to FIGS. 6 and 7, a skew angle R may be identified through the skew check hole 112. The first rotor core 100A and the second rotor core 100B are disposed askew at the skew angle R. When the skew reference surface of the stacked uppermost second rotor core 100B is referred to as A2, A1 and A3 may be visually identified through the skew check hole 112 of the stacked uppermost second rotor core 100B.

An angle between A2 and A1 based on A2 corresponds to a skew angle R between the second rotor core 100B and the first rotor core 100A. In addition, an angle between A3 and A1 based on A1 corresponds to a skew angle R between the first rotor core 100A and the second rotor core 100B disposed thereunder.

FIG. 8 is a view illustrating a cover member and a skew check hole.

Referring to FIG. 8, even when the cover member 130 such as a can or a molding member covers the outer circumferential surface of the rotor plate 110, A1 and A3 may be identified through the skew check hole 112. Accordingly, even in a case in which the rotor 100 is completely manufactured, a skew angle may be visually identified.

A distance R1 from the center CL to an edge of the cover member 130 in the radius direction of the rotor 100 is set such that the skew check hole 112 is not hidden due to the cover member 130.

As described above, the rotor plate, the rotor assembly, the motor, and the vehicle including the same according to the embodiment of the present invention have been specifically described with reference to the accompanying drawings.

The above description is only an example describing a technological scope of the present invention. Various changes, modifications, and replacements may be made without departing from the spirit and scope of the present invention by those skilled in the art. Therefore, the embodiments disclosed above and in the accompanying drawings should be considered in a descriptive sense only and not for limiting the technological scope. The technological scope of the present invention is not limited by these embodiments and the accompanying drawings. The spirit and scope of the present invention should be interpreted by the appended claims and encompass all equivalents falling within the scope of the appended claims.

[Reference Numerals]

| | |
|---|---|
| A, B: SKEW REFERENCE SURFACE | |
| 100: ROTOR | 110: ROTOR PLATE |
| 111: ROTATING SHAFT HOLE | 112: SKEW CHECK HOLE |
| 120: MAGNET | 130; COVER MEMBER |
| 200: ROTATING SHAFT | 300: STATOR |

The invention claimed is:

1. A motor comprising:
a shaft;
a rotor including a shaft hole in which the shaft is disposed, the rotor including a plurality of rotor plates stacked to each other; and
a stator disposed outside the rotor,
wherein each rotor plate includes a plurality of guide pin holes disposed around the shaft hole in a circumferential direction and a skew check hole including a skew reference surface, and
wherein an outer circumferential surface of each rotor plate is attached with magnets, and an angle between lines connecting centers of the adjacent guide pin holes with a center of the shaft hole is greater than a skew angle of each rotor plate.

2. The motor of claim 1, wherein the skew reference surface is disposed such that extended plane of the skew reference surface passes through the center of the shaft hole, and wherein the skew reference surface includes a first skew reference surface and a second skew reference surface which face each other.

3. The motor of claim 2, wherein an angle between the first skew reference surface and the second skew reference surface is greater than the skew angle.

4. The motor of claim 2, wherein the skew check hole is disposed between the guide pin holes in a circumferential direction.

5. The motor of claim 2, wherein an angle between the first skew reference surface and the second skew reference surface is greater than an angle between the first skew reference surface (A1) of the first rotor core and the first skew reference surface (A2) of the second rotor core, wherein the plurality of rotor plates are stacked to form the first rotor core and the second rotor core.

6. The motor of claim 5, wherein the magnets are attached to an outer circumferential surface of the first rotor core and an outer circumferential surface of the second rotor core.

7. The motor of claim 6, further comprising a cover member configured to cover the first rotor core and the second rotor core such that the skew check holes are exposed.

* * * * *